United States Patent
Hailpern (10) Patent No.: US 9,781,594 B2
(45) Date of Patent: Oct. 3, 2017

(54) CONTEXT BASED MOBILE DEVICE

(71) Applicant: HEWLETT-PACKARD DEVELOPMENT COMPANY, L.P., Houston, TX (US)

(72) Inventor: Joshua M Hailpern, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/105,158

(22) PCT Filed: Jan. 30, 2014

(86) PCT No.: PCT/US2014/013882
§ 371 (c)(1),
(2) Date: Jun. 16, 2016

(87) PCT Pub. No.: WO2015/116105
PCT Pub. Date: Aug. 6, 2015

(65) Prior Publication Data
US 2016/0337844 A1    Nov. 17, 2016

(51) Int. Cl.
*G06F 17/27* (2006.01)
*H04W 8/22* (2009.01)
*G06Q 30/02* (2012.01)

(52) U.S. Cl.
CPC .......... *H04W 8/22* (2013.01); *G06F 17/2765* (2013.01); *G06Q 30/02* (2013.01)

(58) Field of Classification Search
CPC .................................. H04W 24/02; G06F 9/48
See application file for complete search history.

(56) References Cited

U.S. PATENT DOCUMENTS

| | | | |
|---|---|---|---|
| 8,949,353 B1* | 2/2015 | Beguin | H04L 51/28 709/206 |
| 9,167,404 B1* | 10/2015 | Freed | H04W 4/24 |
| 2002/0184402 A1 | 12/2002 | Gangopadhyay | |
| 2006/0200834 A1 | 9/2006 | Cukierman et al. | |
| 2009/0076952 A1* | 3/2009 | Cadenas | G06Q 20/102 705/40 |
| 2010/0080368 A1 | 4/2010 | Erhart | |
| 2010/0293543 A1* | 11/2010 | Erhart | H04W 8/18 718/1 |

(Continued)

OTHER PUBLICATIONS

Manuel Roman and Roy H. Campbell, "A User-centric, Resource-Aware, Context-sensitive, Multi-Device Application Framework for Ubiquitous Computing Environments" Report No. UIUCDCS-R-2002-2284 UILU-ENG-2002-1728, Jul. 2002, pp. 1-15.

*Primary Examiner* — Kamran Afshar
*Assistant Examiner* — Farideh Madani
(74) *Attorney, Agent, or Firm* — Rathe Lindebaum LLP (57) ABSTRACT

A context for a mobile device is determined based on received electronic signals, wherein the context is either a personal context or a work context. Depending upon whether the determined context is the personal context of the work context, a type of information from either a work data storage or a personal data storage is accessed and displayed on the mobile device. In one implementation, a keyword identified in an event on the mobile device is identified and used to retrieve and display supplemental information for the event.

12 Claims, 8 Drawing Sheets

(56) References Cited

U.S. PATENT DOCUMENTS

| | | | |
|---|---|---|---|
| 2010/0316219 A1* | 12/2010 | Boubion | G02B 21/16 |
| | | | 380/259 |
| 2011/0051646 A1 | 3/2011 | Rice | |
| 2012/0115453 A1 | 5/2012 | Zheng | |
| 2012/0140709 A1 | 6/2012 | Hou | |
| 2013/0045700 A1 | 2/2013 | Stallman et al. | |
| 2013/0085860 A1 | 4/2013 | Summers et al. | |
| 2013/0109436 A1 | 5/2013 | Tat et al. | |
| 2014/0267011 A1* | 9/2014 | Devries | G06F 3/0304 |
| | | | 345/156 |
| 2015/0094018 A1* | 4/2015 | Sanjeev | H04W 4/24 |
| | | | 455/406 |

* cited by examiner

CONTEXT BASED MOBILE DEVICE

BACKGROUND

Mobile devices, such as smart phones, laptop computers and tablet computers, are frequently utilized in both a personal environment and a work environment of a user. In many circumstances, it is difficult to utilize the mobile device in a relevant, cost effective and appropriate work context and personal context sensitive manner.

DETAILED DESCRIPTION OF THE EXAMPLE EMBODIMENTS

Figure 1:
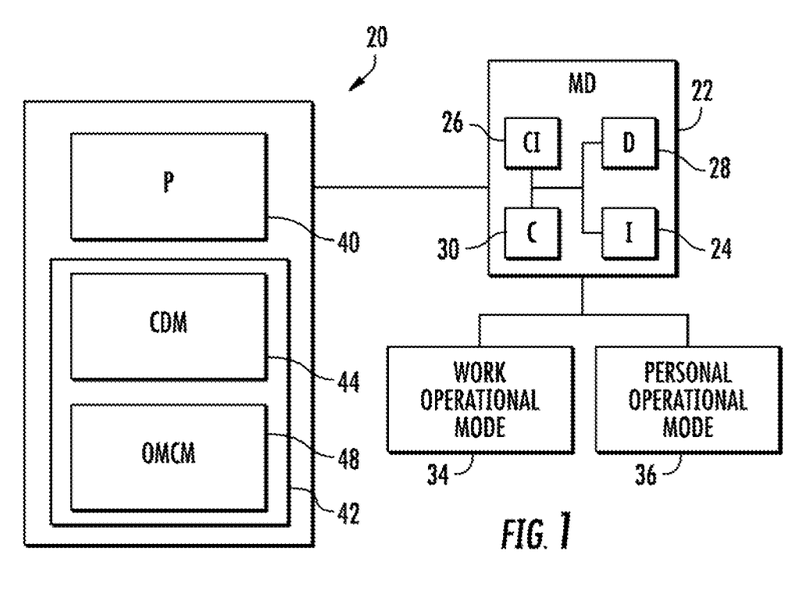
FIG. 1 is a schematic illustration of an example mobile device context control system with an example mobile device 22.

FIG. 1 schematically illustrates an example mobile device context control system 20. As will be described hereafter, control system 20 automatically determines or identifies the context in which a mobile device is being utilized. Based upon this determined context, context control system 20 automatically switches the operation of mobile device 20 between either a work operational mode or a personal operational mode. As a result, context control system 20 facilitates relevant, cost-effective and appropriate operation of a mobile device in a context sensitive manner.

As shown by FIG. 1, mobile device context control system 20 is for use with a mobile device 22. Mobile device 22 comprises a portable or mobile computing device which is sized to be personally carried and transported from place to place and which facilitates wireless communication. In one implementation, mobile device 22 comprises a smart phone. In other implementations, mobile device 22 comprises a tablet computer, a laptop, or other portable computing device.

Mobile device 22 comprises input 24, communication interface 26, display 28 and controller 30. Input 24 comprises one or more interfaces by which mobile device 22 may receive commands, instructions, data or other input locally from a person. Examples of input 24 include, but are not limited to, a keyboard, a keypad, a touchscreen, a stylus, a mouse, a microphone with associated speech recognition software, gyroscope, video camera with associated facial or emotional recognition software, touchpad and the like.

Communications interface 26 comprises a device to facilitate the transmission and receipt of external communication signals in a wireless fashion. Communications interface 26 facilitates communication through radiofrequency signals, optical signals or other over the air transmitted signals. Example of communication interface 26 include, but are not limited to, one or more antennas, GPS, infrared or other optical sensors/receivers and the like.

Display 28 comprises one or more monitors, screens or the like for visibly presenting information to a user of mobile device 22. In one implementation, display 28 may comprise one or multiple touch screen(s), additionally serving as part of input 24.

Controller 30 comprises one or more processing units to control the operational mobile device 22. Controller 30 receives signals from input 24 and medications interface 26. Controller 30, following code or instructions contained in a non-transitory computer-readable medium, directs the operation of display 28 and any auditory device associated with mobile device 22. Controller 30, following instructions or input from context control system 20 switches the operation of mobile device 22 between a work operational mode 34 and a personal operation mode 36.

For purposes of this application, the term "processing unit" shall mean a presently developed or future developed processing unit or a plurality of processing units that execute sequences of instructions contained in a memory. Execution of the sequences of instructions causes the processing unit(s) to, for example, generate control signals. The instructions may be loaded in a random access memory (RAM) for execution by the processing unit(s) from a read only memory (ROM), a mass storage device, or some other persistent storage. In other embodiments, hard wired circuitry may be used in place of or in combination with software instructions to implement the functions described. For example, controller 30 may be embodied as part of one or more application-specific integrated circuits (ASICs). Unless otherwise specifically noted, the controller is not limited to any specific combination of hardware circuitry and software, nor to any particular source for the instructions executed by the processing unit.

Mobile device context control system 20 directs controller 30 to automatically switch between the work operational mode 34 and the personal operation mode 36. Context control system 20 comprises processing unit 40 and memory 42 comprising context determination module 44 and operational mode control module 48. Processing unit 40 operates according to instructions provided by context determination module 44 and operational mode control module 48 to output commands for automatically switching mobile device 22 between the work operational mode 34 and the personal operation mode 36.

Memory 42 comprises a non-transitory computer-readable medium containing code for directing the operation of processing unit 40. In other implementations, memory 42 may comprise an integrated circuit containing logic for directing processing unit 40 to carry out the operations of context determination module 44 and operational mode control module 48. Context determination module 44 comprises code or logic in the form of software or circuitry that directs processing unit 40 to determine the present context in which mobile device 22 is employed. In one implementation, context determination module 44 directs processing unit 40 to determine the present context based upon electronic signals received by processing unit 40 indicating a present geo-location of mobile device 22. For example, processing unit 40 may receive electronic signals indicating that mobile device 22 is currently at a geographic location that corresponds to location or region previously identified and stored as a work location or environment for the user mobile device 22 such as at the mobile device owner's place of work. Alternatively, processing unit 40 may receive electronic signals indicating that mobile device 20 is currently at a geographic location that corresponds to a location or region previously identified and stored as a personal location or environment for the user of mobile device 22 such as the mobile device owner's home or other geo-location that is not associated with the mobile device owner's work. In some implementations, geolocations may be identified by processing unit 40 as either for a home context or a personal context by cross-referencing other sources, such as a personal or work calendar for the user. For example, locations may be determined as a "home" or "work" context based on calendar information such as a calendar labeled "home" has an activity at a given park, thus associating said park with the home context during said timeframe as denoted in the calendar.

In implementations where context determination model 44 directs processing unit 40 to determine the context of mobile device 22 based upon geo-location, processing unit 40 may base the context determination on signals from a universal or general geo-location source such as a global positioning satellite system. In another implementation, processing unit 40 may alternatively or additionally receive such signals from local location indicating beacons or other signal sources existing at the mobile device owner's place of work and/or personal environment such as the mobile device owner's home.

In one implementation, the local signal sources may be specifically provided for the purpose of notifying system 20 of the context. In another implementation, such local signal sources may be dedicated for other purposes, but inherently identify the local environment. For example, in one implementation, processing unit 40 may receive signals from other wireless electronic components found in the work environment, such as signals from a work router or other component of a work local area network, signals from a particular wireless printer located in a work environment or the like. Upon detecting such signals, processing unit 40 may determine mobile device 22 is currently in a work environment. In another implementation, processing unit 40 may receive signals from other wireless electronic components found in a personal environment such as signals from a television, a game counsel, a wireless appliance, a personal local area network component, wireless phone or the like. Upon detecting such signals, processing unit 40 may determine that mobile device 22 is currently in a personal environment. In one implementation, in the absence of receiving signals indicating a worker personal context, system 20 may automatically default to a predefined context, either the work context or the personal context.

In another implementation, context determination module 44 directs processing unit 40 to determine the present context based upon electronic signals received by processing unit 40 indicating the current time, whether it be the current time of day, the day of the week and/or the day of the month or year. For example, upon receiving signals indicating the time to be midnight, processing unit 40, following instructions contained in context determination model 44, may determine the current context to be a personal context. In contrast, upon receiving signals indicating the time to be 10 AM on a Wednesday, processing unit 40 may determine the current context to be a work context. Upon receiving signals indicating the time to be Sunday or a holiday, processing unit 40 may determine the current context to be a personal context. In one implementation, context determination module 44 directs processing unit 40 to retrieve agenda items from the mobile device owner's calendar stored on the mobile device or stored remotely, wherein context determination module 44 determines the current context of mobile device 22 based upon both the current time and the stored agenda item for the current time. For example, the current time may be 10 AM on Saturday, but the stored agenda item indicates a scheduled work meeting at the office for this time period. Based upon such received signals, processing unit 40 may determine the current context to be a work context.

In another implementation, context determination module 44 directs processing unit 40 to determine the present context based upon event electronic signals received by processing unit 40. An "event" refers to a distinct occurrence taking place or scheduled to take place, wherein the event occurs through use of mobile device 22 or wherein the owner of mobile device 22 is notified regarding the event by mobile device 22. Examples of an "event" include, but are not limited to, a received communication such as a received phone call, a received email, a received text message, a received social media communication (Tweet and the like), an outgoing communication such as an outgoing phone call, an outgoing text message, an outgoing social media communication, and a scheduled agenda item such as a scheduled phone call, a scheduled in person meeting, a scheduled online meeting and the like.

Context determination module 44 directs processing unit 40 in the analysis of the received signals for the event to determine the present context of mobile device 22. For example, in one implementation, in response to receiving signals for an event comprising a received communication, context determination module 44 directs processing unit 40 to identify the source of the communication and based upon the identified source, determine whether the present context of mobile device 22 is a personal context or a work context. In one implementation, context determination model 44 directs processing unit 40 to identify one or more keywords from the electronic signals. Examples of such keywords may comprise an identification of the source of the communication such as the identification of the caller (caller ID) or the sender/transmitter of the email, text or social media message. Using such keywords, context determination module 44 determines whether the present context of mobile device 22 is a personal context or a work context. The determination of the context of mobile device 22 is made by context determination module 44 in the same fashion with respect to outgoing communications, wherein the received signals are analyzed to identify keywords indicating the recipient of the outgoing communication and wherein the identified recipient is used as a basis by context determination module 44 to determine the present context of mobile device 22.

In another implementation, context determination module 44 directs processing unit 40 to identify keywords in the communication itself, whether incoming or outgoing. In one implementation, employing speech recognition software, context determination module 40 may identify keywords in the content of the spoken communication, wherein the identified keywords are utilized to determine the context. In another implementation, context determination module 40 may identify keywords from the text of an email, text message or social media communication and utilize such keywords to determine the present context of mobile device 22. For example, during a communication, the name of the company associated with the owner of mobile device 22 may be spoken or may be composed. Identification of the company in the spoken or written communication by processing unit 40 may cause processing unit 40 to automatically determine that mobile device 22 is currently operating in a work environment or context.

In one implementation, in response to receiving signals for an event comprising a calendar event or agenda item, context determination module 44 directs processing unit 40 to identify keywords in the agenda item and to base the determination of the present context of mobile device 22 on such identified keywords. For example, upon receiving signals for the display of a calendar of agenda items and upon receiving further signals indicating a selection of a particular agenda item, context determination module 44 directs processing unit 42 search for one or more predefined keywords in the stored agenda item. Utilizing the identified keywords, context determination module 44 determines the context of mobile device 22. In a similar fashion, upon receiving signals that a scheduled event reminder is being presented or is about to be presented to the user mobile device 22, context determination module 44 directs processing unit 42 identify keywords in the reminder notice or in the stored calendar agenda item associated with reminder and to determine the present context of mobile device 22 using such keywords.

In one implementation, context determination module 44 determines the present context of mobile device 22 based upon multiple criteria, providing more accurate context determination. For example, in one implementation, context determination module 44 determines the present context a mobile device 22 utilizing one or more of or even each of the present geo-location of mobile device 22, the current time, the source or recipient of a communication, and keywords found in the content of the communication and/or agenda item.

In one implementation, context determination module 44 determines the present context a mobile device 22 based upon different weights applied to each of the different criteria. For example, context determination module 44 may place greater weight or importance upon the geo-location of mobile device 22 as compared to the present time when determining the context of mobile device 22. In one implementation, system 20 determines the present context of mobile device 22 according to a weighting scheme for the different criteria as entered by the user of mobile device 22.

Operational mode control module 48 comprises code or logic contained in software or circuitry for directing processing unit 40 to generate control signals for automatically switching the operation of mobile device 22 between either the work operational mode 34 or the personal operational mode 36 based upon the determined present context of mobile device 22. In some implementations, mobile device 22 may be automatically switchable between other additional operational modes. Depending upon the determined context in which mobile device 22 is presently employed, operational mode control module 48 causes processing unit 40 to generate control signals causing mobile device 22 to differently allocate hardware or hardware functions (e.g. CPU cores allocated to tasks, wireless antenna for different activities, which display to use), billing functions (e.g which wireless account to use for data consumption, or which credit card to use for a purchase), to access and retrieve data from different data storages, to differently access, utilize or output identification or account values, and/or to pre-load different applications. As a result, system 20 automatically, without user input, modifies the operation of mobile device 22 to adapt to the present automatically determined context in which mobile device 22 is being used to facilitate relevant, cost-effective, processing-effective, battery-effective and appropriate operation of a mobile device in a context sensitive manner.

In the example illustrated, mobile device context control system 20 is embodied as part of mobile device 22. Memory 42 along with context determination module 44 and operational mode control module 48 are stored in memory or circuitry carried by mobile device 22. Processing unit 40 is also embodied by mobile device 22. In one implementation, the functions of processing unit 40 are carried out by the processing unit of controller 30.

In other implementations, mobile device context control system 20 comprises components that are separate and remote from mobile device 22. For example, in one implementation, system 20 may be embodied remote from mobile device 22, such as where system 20 resides in the computing "cloud", wide area network server or local area network server. In such an implementation, mobile device 22 transmits signals to processing unit 40, facilitating the determination of the present context of mobile device 22 by processing unit 40 in accordance with instructions provided by context determination module 44. In such an implementation, system 20 may transmit signals to the remotely located mobile device 22, switching the operation of mobile device 22 based upon the determined context.

In another implementation, context determination module 44 and operational mode control module 48 may reside at a remote location respect to mobile device 22, wherein the processing unit 40 carrying out the instructions of such modules is embodied within mobile device 22. In still another implementation, context determination module 44 and processing unit 40, operating under the instruction of context determination module 44, are remotely located with respect to mobile device 22, while operational mode control module 48 resides in mobile device 22 and provides instructions carried out by a processing unit associated with controller 30. In such an implementation, mobile device 22 transmits signals to the remote location where context determination module 44 identifies a context of mobile device 22 and reports the identified context back to mobile device 22, wherein mobile device 22 automatically switches operational mode in accordance with instructions provided by the local operational mode control module 48.

Figure 2:
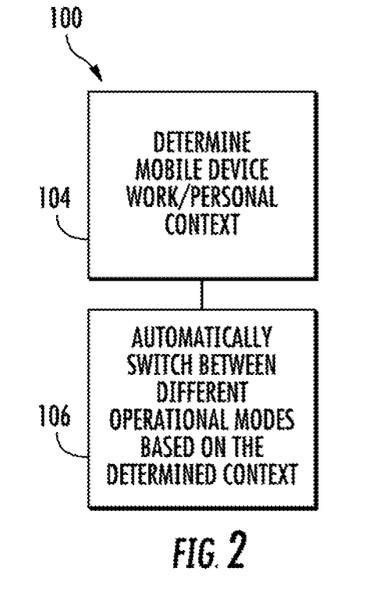
FIG. 2 is a flow diagram of an example method that may be carried out by the system of FIG. 1.

FIG. 2 is a flow diagram of an example method 100 that may be carried out by system 20 and mobile device 22 of FIG. 1. As indicated by block 104, context determination module 44 of system 20 automatically determines whether mobile device 22 is presently being used or employed in a work context or a personal context based upon received electronic signals. As indicated by block 106, based upon the determined work or personal context, operational mode control module 48 automatically, without specific user input, switches or changes the operation of mobile device 22 between different operational modes. As noted above, in response to control signals from system 20 which are based upon the determined context, mobile device 22 may differently allocate hardware or hardware functions, may access and retrieve data from different data storages, may differently access, utilize or output identification or account values, and/or may pre-load different applications.

Figure 3:
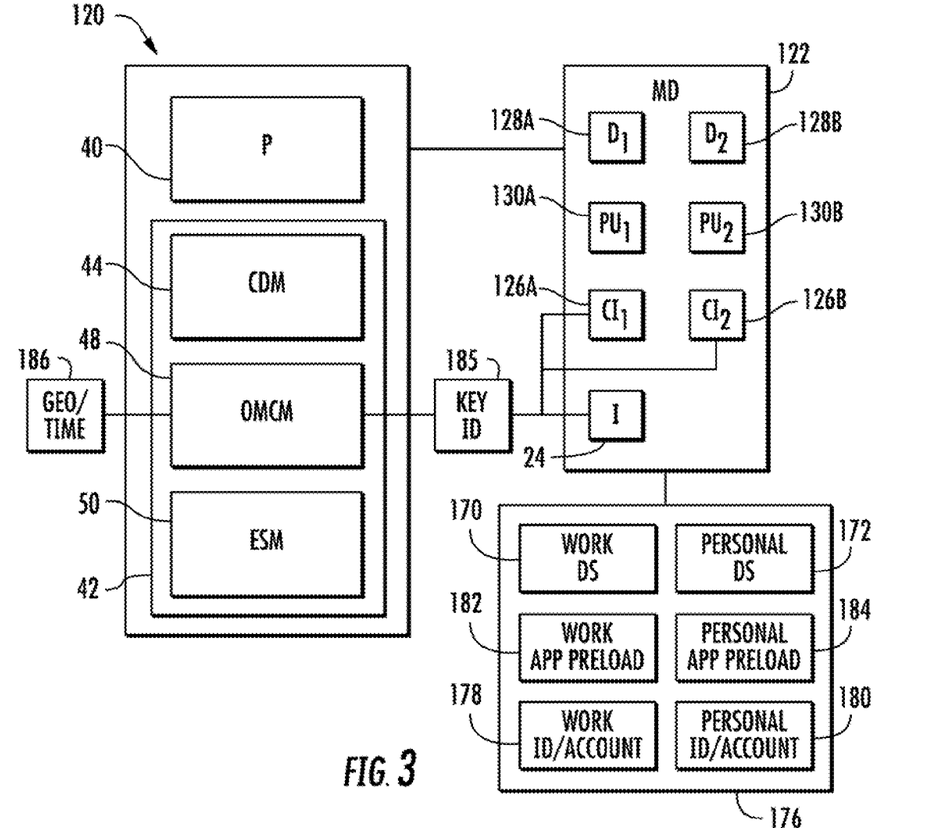
FIG. 3 is a schematic illustration of another example mobile device context control system with another example mobile device.

FIG. 3 schematically illustrates mobile device context control system 120, a particular implementation of system 20, to control or switch between different operational modes for mobile device 122, a particular implementation of mobile device 22. Those components of system 120 and mobile device 122 which correspond to components of system 20 and mobile device 22 are numbered similarly.

Mobile device 122 is similar to mobile device 22 in that mobile device 122 comprises input 24 and controller 30 (described above). Mobile device 122 further comprises two or more different hardware components that perform similar functions. In the example illustrated, mobile device 22 comprises multiple communication interfaces 126A, 126B, multiple displays 128A, 128B and multiple processing units 130A, 130B. Each of the multiple communication interfaces 126A, 126B, each of the multiple displays 126A, 126B and each of the multiple processing units 130A, 130B have different associated characteristics. For example, communication interfaces 126A and 126B have different speeds, ranges or associated service provider costs. Displays 128A, 128B have different levels of resolution or power consumption. For example, in one implementation, display 128A comprises a liquid crystal or light emitting diode display while display 128B comprises an e-ink display. Processing units 130A and 130B have different speeds or capabilities.

Mobile device context control system 120 is similar to mobile device context control system 20 except that system 120 is specifically illustrated as comprising operational mode control module 148 and additionally comprises event supplementing module 150. Those remaining components of system 120 which correspond to components of system 20 are numbered similarly.

Figure 4:
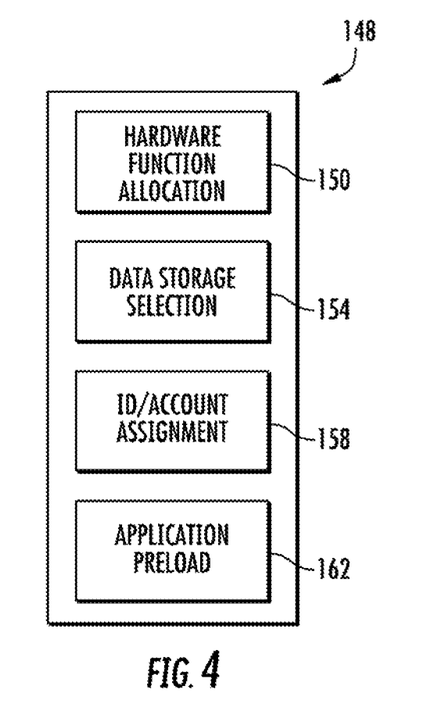
FIG. 4 is a schematic diagram of an example operational mode control module of the system of FIG. 3.

FIG. 4 illustrates one example of operational mode control module 148. Operational mode control module 148 comprises hardware function allocation module 150, data storage selection module 154. ID/account assignment module 158 and application preload module 162. Operational mode control module 148 comprises code or logic contained in software or circuitry to allocate hardware functions of mobile device 122 based upon the determined present context of mobile device 122. Depending on the particular determined context of mobile device 122, hardware function allocation module 150 assigns or allocates use of the different hardware options. For example, in a determined work context, module 150 may allocate use of the higher-end or enhanced display 128A, processing unit 130A or communication interface 126A to work applications while allocating use of the lower end or lower-cost display 128B, processing unit 130B or communication interface 1268 to personal applications that may be concurrently running or operating on mobile device 122. For example, in a work context, module 150 may direct work communications or work projects/applications to a higher-end display while directing personal communications or personal projects/applications to a lower end display of mobile device 122.

Data storage selection module 154 comprises code or logic embodied in software or circuitry to direct processing unit 40 to generate control signals to automatically access one of two data storages for the same type of information based upon whether the determined context of mobile device 122 is a work context or a personal context. In the example illustrated, module 154, depending upon the determined context, accesses either a work data storage 170 or a personal data storage 172 of memory 176 (shown in FIG. 3) for the same type of information, wherein memory 176 or portions of memory 176 are either embodied within mobile device 122 or are remote from but accessible by mobile device 122. In one implementation, the work data storage 170 and the personal data storage 172 are provide on separate memories. In yet another implementation, work data storage 170 and personal data storage 172 are on a same memory with distinct partitioning or identifiers.

Figure 5:
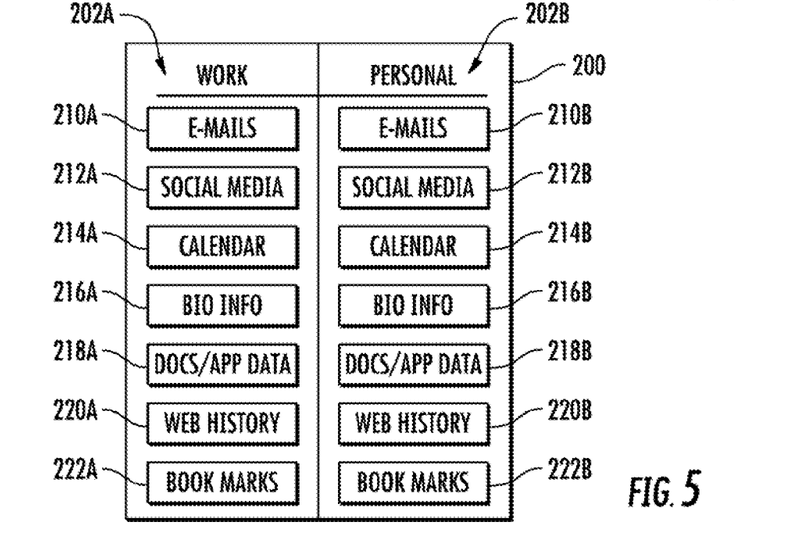
FIG. 5 is a schematic diagram of an example work and personal data storage portions of the system of FIG. 3.

FIG. 5 schematically illustrates an example memory 200 containing both a work data storage portion 202A and a personal data storage portion 202B (collectively referred to as portions 202). As shown by FIG. 5, each of portions 202 includes the same type of data or information, but for different contexts: a work context or a personal context. In the example illustrated, work data storage portion 202A and personal data storage portion 202B store emails 210A, 210B, social media communications 212A, 212B, calendar information 214A, 214B, biographic/contact information 216A, 216B, documents/application data 218A, 218B, web viewing history 220A, 220B and web bookmarks 222A, 222B, respectively.

Based upon the determined context, data storage selection module 154 automatically accesses one of portions 202A, 202B or a selected type of information from one of the portions 202A, 202B. In one implementation, data storage selection module 154 accesses and retrieves data from one of portions 202 while ignoring, blocking or filtering out data from the other of portions 202. For example, if the determined context is a work context, data storage selection module 154 may retrieve, provide access to or display emails 210A while ignoring, blocking or filtering out emails 210B pertaining to the personal context. Likewise, if the determined context is the personal context, data storage selection module 154 may retrieve, provide access to or display emails 210B while ignoring, blocking or filtering out emails 210A pertaining to the work context. If the determined context is a personal context, data storage selection module 154 may retrieve, provide access to or display any of the different types of data 212A-222A while concurrently ignoring, blocking or filtering out the types of data 212B-222B, respectively. Likewise, if the determined context is a personal context, data storage selection module 154 may retrieve, provide access to or display any of the different types of data 212B-222B while concurrently ignoring, blocking or filtering out the types of data 212A-222A, respectively. As a result, the user of mobile device 122, when retrieving and displaying a particular type of data in one of the work environment and the personal environment is less likely to accidentally retrieve and display the same type of data for the other of the work environment and the personal environment, which may be embarrassing or inappropriate. For example, data storage selection 154 reduces the likelihood of a person accidentally displaying a personal web history, personal bookmarks, personal documents, personal social media messages or personal emails while in the work context.

In addition to reducing a likelihood of inappropriate personal data being presented and displayed in a work environment, data storage selection 154 also enhances efficiency in the use of mobile device 122. Because data storage selection module 154 automatically retrieves, provides access to or displays information based upon the automatically determined context, storage selection module 154 reduces the processing power and/or time of the user of mobile device 122 to sort through extraneous information that is not relevant for the particular context. For example, a user mobile device 122 attempting to locate a prior email, a prior social media message or contact information in the work environment will not have to sort through such information associated with the personal context. A user mobile device 122 attempting to locate a prior email, a prior social media message or contact information in the personal environment will not have to sort through such information associated with the work context.

ID/account assignment module 158 comprises code or logic embodied in software or circuitry to direct processing unit 40 to generate control signals to automatically output or utilize a particular identification or account for operations of mobile device 122 depending upon whether mobile device 122 is in either the work context or the personal context. In one implementation, memory 176 may include one or more identifications or accounts 178 assigned to or for use in a work context and may include one or more identifications or accounts 180 assigned to or for use in a personal context. In one implementation, module 158 may direct mobile device 122 to output or utilize different identifications depending upon whether the determined context is a personal context or a work context. For example, if it is determined that mobile device 122 is being employed in a work context, module 158 causes outgoing communications to utilize a first work identification, such as a first signature block, whereas if it is determined that mobile device is being employed in a personal context, module 158 causes outgoing communications to utilize a second different personal identification, such as a second different signature block. In such a manner, module 158 reduces likelihood that a personal communication is accidentally associated with a work context, such as a person's employer.

In another implementation, module 158 may direct mobile device 122 to utilize distinct accounts depending upon the context. For example, a user of mobile device 122 may utilize two different social media accounts, one for work and one for personal related matters. Based upon the determined present context of mobile device 22, work or personal, module 158 may automatically select and utilize the appropriate account. Similar functions pertain to emails and any other outgoing communications. In such a manner, module 158 reduces the likelihood that a personal message accidentally is made upon a service or account associated with a work context.

In yet another implementation, module 158 may direct mobile device 122 to automatically assign financial or other charges based upon the determined present context of mobile device 122. In one implementation, module 158 may automatically charge transactions made using communication with mobile device 122 or made using mobile device 22, itself, as a charge or credit implementing device to one of more different charge accounts depending upon the determined present context of mobile device 122. For example, module 158 may automatically assign a purchase made on a website accessed by the user on mobile device 22 to a company credit card account identified in accounts 178 if the determined context is a work context or may automatically assign the purchase to a personal credit card account identified accounts 180 if the determined context is a personal context.

In some implementations, mobile device 122 may itself serve as a hardware token, authentication token, USB token, cryptographic token, virtual token or fob. In such implementations, mobile device 122 is switchable between different states in which mobile device 122 serves a such a token or fob having different authorization capabilities or associated with different charge accounts. In such an implementation, module 158 may automatically switch the operational mode of mobile device 122 such that mobile device 122 is serving as the token or fob associated with the particular determined context. For example, in the work context, module 158 may automatically modify mobile device 122 such of mobile device 122 operates or serves as a work token or fob for authorization functions or charging work accounts, whereas in the personal context, module 158 may automatically switch mobile device 122 to an operational mode such that mobile device 122 operates or serves as a personal token or a personal fob for charging personal accounts.

Application preload module 162 comprises code or logic embodied in software or circuitry to direct processing unit 40 to generate control signals to automatically preload, prelaunch or pre-cache a certain application or group of applications depending upon whether the determined context or mobile device 22 is a work context or a personal context. Preloading an application may involve installing or loading an application or a group of applications into a temporary short-term accessible memory, such as a random access memory. By preloading/pre-caching applications, module 162 provides quicker access to such applications, which appear to load faster, and reduces time for running and displaying such applications or programs. In one implementation, memory 176 may store or assign different applications or different capabilities of particular applications to different contexts. For example, memory 176 may store or assign a first set of applications or application authorizations 182 (shown in FIG. 3) for use in a work context while storing or assigning a second set of applications or application authorizations or capabilities 184 (shown in FIG. 3) for use in a personal context. Because module 162 automatically selects which application or which groups of applications to preload based upon the determined context, those applications most appropriate for the particular context are loaded while those applications less relevant to the particular context remain inactive or in other states. As a result, the user of mobile device 22 is provided with quicker access to context appropriate applications and less relevant applications or programs are not preloaded, conserving processing bandwidth and memory space.

Although system 120 is illustrated as automatically switching operation of mobile device 122 between the different operational modes including hardware function allocation, data storage selection, ID/account assignment and application preloads, in other implementations, system 120 may automatically switch between less than all of such different operational modes. In one implementation, mobile device 122 may offer each of such capabilities which are selectable by the owner of mobile device 22. In some implementations, mobile device 122 may automatically switch to the appropriate mode of operation based upon the determined context, but may immediately follow up with a message notifying the user of mobile device 22 of the selected mode and either prompt for confirmation for the selected mode or facilitate a user input override of the selected mode.

Event supplementing module 150 comprises code or logic embodied in software or circuitry to direct processing unit 40 to retrieve and display on mobile device 122 supplemental information based upon one or more keywords identified in signals for the event on mobile device 122. Examples of types of data from which information may be retrieved and utilized to supplement an event being displayed on mobile device 122 include, but are not limited to, emails, calendar data, biographical/contact information, stored or network available social media communications and/or stored documents/application data. Examples of events for which supplemental information may be provided include, but are not limited to, incoming communications, outgoing communications, calendar/agenda items and event reminders. For example, in response to receiving electronic signals for an incoming communication (incoming phone call, email, social message, text message), module 150 may direct processing unit 40 to identify one or more keywords from the electronic signals such as the identification of the sender of the incoming communication. Based upon such keywords identifying the sender of the incoming communication, module 150 may direct processing unit 40 to search and retrieve other previously store data. For example, if the keyword identifies a particular person sending the incoming communication, module 150 may direct processing unit 40 to supplement the incoming message being presented on the display of the mobile device 122 with additional information related to the keyword (the name of the sender) such as biographical/contact information regarding the sender, prior communications received from or sent to the sender, prior documents composed or reviewed by the sender and/or information regarding prior meetings held with the sender.

If the event comprises an outgoing communication, module 150 may direct processing unit 40 to analyze the electronic signals to identify keywords identifying the recipient of the outgoing communication. Upon identifying the recipient of the outgoing communication, module 150 may direct processing unit 40 to supplement the outgoing message by automatically presenting additional information related to the keyword (the name of the recipient) on the display of the mobile device 122 during the event (during the communication). Examples of such supplemental information comprise biographical/contact information regarding the sender, prior communications received from or sent to the recipient, prior documents composed or reviewed by the recipient and/or information regarding prior meetings held with the recipient. In one implementation, module 150 may direct processing unit 40 to present the supplemental information on the display of mobile device 122 as soon as the recipient for the outgoing message is input and identified, wherein the supplemental information is presented during composition of the outgoing message or before the outgoing message is sent. As a result, the supplement information may assist the owner of mobile device 122 in composing the outgoing message or ensuring its accuracy.

With respect to both incoming communications and outgoing communications, module 150 may also be operable in a mode in which module 150 identifies one or more keywords in the actual content of the message. For example, for incoming audible phone calls, module 150 may utilize speech recognition to identify particular keywords spoken by a designated person or by multiple persons in the conversation, wherein module 152 retrieve and display supplemental information based upon such keywords. For written incoming and outgoing messages, such as social media messages, text messages, emails and the like, module 150 may search such messages for particular predetermined keywords and utilize such keywords to retrieve and display supplemental information on mobile device 122 during the communication.

With respect to events such as a calendar or agenda item, or a reminder being displayed for an event such as a scheduled phone conference, meeting or the like, module 150 may direct processing unit 40 to identify one or more keywords in the content of the calendar or agenda item or the reminder. Module 150 utilizes the identified keywords to direct processing unit 40 to retrieve supplemental information and display the supplemental information along with or in a linked to fashion with the user selected agenda item on a displayed calendar. As a result, the user of mobile device 122 can quickly get up to speed and be prepared for an upcoming agenda item.

In one implementation, event supplementing module 150 directs searches for supplemental information based upon the context in which mobile device 122 is presently operating as determined by context determination module 44. For example, if context determination module 44 determines that mobile device 122 is presently operating in a work environment or context, event supplementing module 150 may restrict the search for supplemental information to work storage portions such as work storage portion 202A shown in FIG. 5. If context determination module 44 determines that mobile device 122 is presently operating in a personal and context, event supplementing module 150 may restrict the search for supplemental information to personal storage portions such as personal storage portion 202B. In other implementations or selectable operational modes, event supplementing module 150 may not restrict it searches for supplementing information based upon the determined context. In some implementations, system 120 may omit event supplementing module 150.

Figure 6:
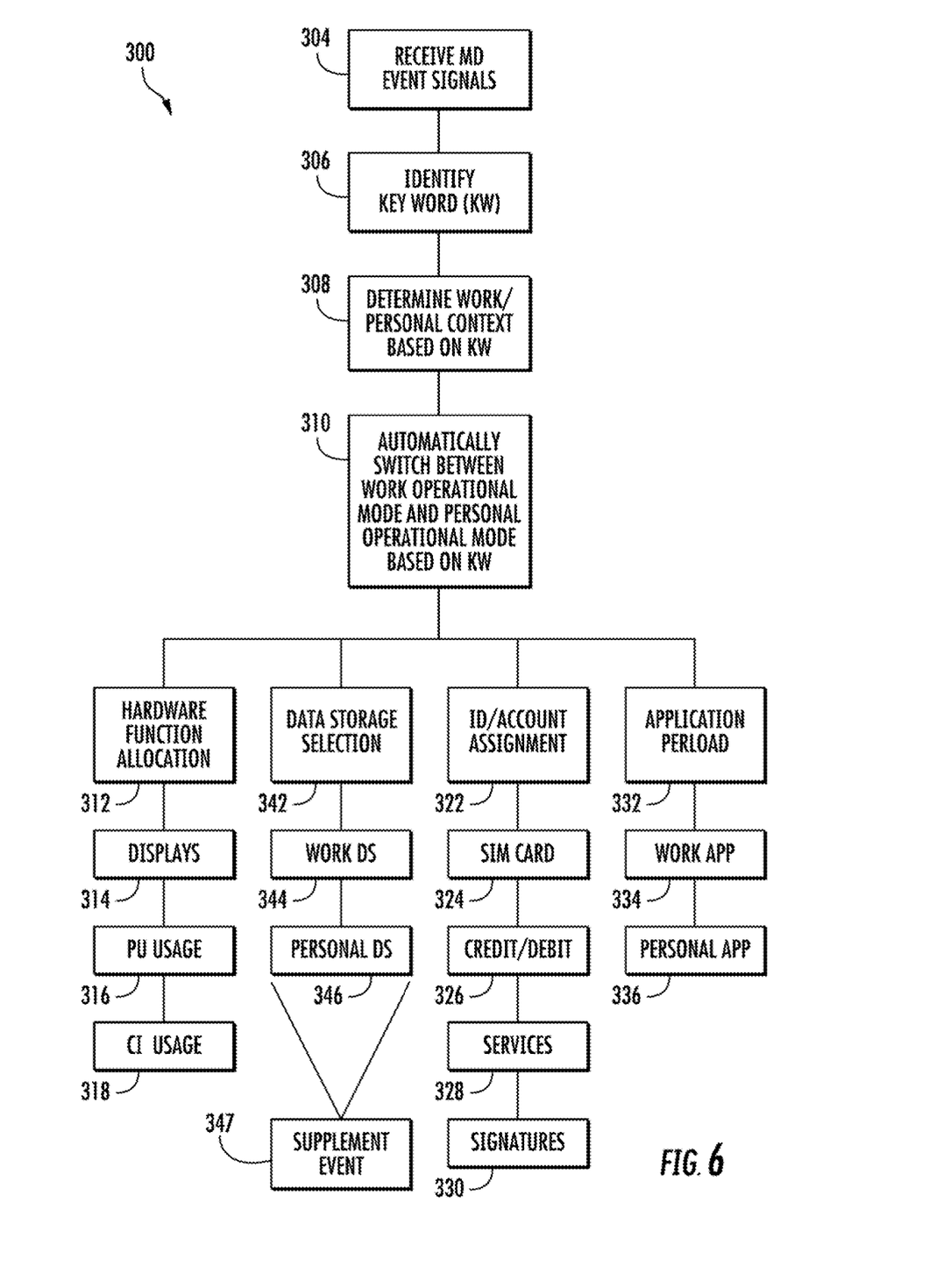
FIG. 6 is a flow diagram of an example method that may be carried out by the system of FIG. 3.

FIG. 6 is a flow diagram of an example method 300 which may be carried out by system 120 with mobile device 122. As indicated by block 304, processing unit 40 receives event signals from mobile device 122. As noted above, an "event" refers to a distinct occurrence taking place or scheduled to take place, wherein the event occurs through use of mobile device 122 or wherein the owner of mobile device 122 is notified regarding the event by mobile device 122. Examples of an "event" include, but are not limited to, a received communication such as a received phone call, a received email, a received text message, a received social media communication (Tweet and the like), an outgoing communication such as an outgoing phone call, an outgoing text message, an outgoing social media communication, and a scheduled agenda item such as a scheduled phone call, a scheduled in person meeting, a scheduled online meeting and the like.

As indicated by block 306, context determination module 44 directs processing unit 40 to analyze the received signals for the event to identify one or more keywords to facilitate the determination of the present context of mobile device 122. For example, in one implementation, in response to receiving signals for an event comprising a received communication, context determination module 44 directs processing unit 40 to identify one or more keywords 185 from the electronic signals. to identify the source of the communication and based upon the identified source, determine whether the present context of mobile device 122 is a personal context or a work context. Examples of such keywords may comprise an identification of the source of the communication such as the identification of the caller (caller ID) or the sender/transmitter of the email, text or social media message. The identification of keywords is made by context determination module 44 in the same fashion with respect to outgoing communications, wherein the received signals are analyzed to identify keywords 185 indicating the recipient of the outgoing communication and wherein the identified recipient is used as a basis by context determination module 44 to determine the present context of mobile device 122.

In another implementation, context determination module 44 directs processing unit 40 to identify keywords in the communication itself, whether incoming or outgoing. In one implementation, employing speech recognition software, context determination module 40 may identify keywords in the content of the spoken communication, wherein the identified keywords are utilized to determine the context. In another implementation, context determination module 40 may identify keywords from the text of an email, text message or social media communication and utilize such keywords to determine the present context of mobile device 122. For example, during a communication, the name of the company associated with the owner of mobile device 122 may be spoken or may be composed. Identification of the company in the spoken or written communication by processing unit 40 may cause processing unit 40 to automatically determine that mobile device 122 is currently operating in a work environment or context.

In one implementation, in response to receiving signals for an event comprising a calendar event or agenda item, context determination module 44 directs processing unit 40 to identify keywords in the agenda item and to base the determination of the present context of mobile device 122 on such identified keywords. For example, upon receiving signals for the display of a calendar of agenda items and upon receiving further signals indicating a selection of a particular agenda item, context determination module 44 directs processing unit 42 search for one or more predefined keywords in the stored agenda item. In a similar fashion, upon receiving signals that a scheduled event reminder is being presented or is about to be presented to the user mobile device 122, context determination module 44 directs processing unit 40 to identify keywords in the reminder notice or in the stored calendar agenda item associated with reminder and to determine the present context of mobile device 122 using such keywords.

As indicated by block 308, context determination module 44 determines whether the present context of mobile device 122 is a personal context or a work context. In one implementation, context determination module 44 may consult a database storing particular keywords that have been previously assigned to either the work context or the personal context, wherein context determination module looks for such keywords and makes the determination of whether mobile device 122 is presently being employed in either the work context or the personal context based upon what keywords assigned to a particular context are identified.

In circumstances where keywords assigned to both work and personal contacts are identified, context determination module 44 additionally selects either the work context or the personal context depending upon the number of keywords identified that have been assigned to the work context and/or the number of keywords identified that have been assigned to the personal contact. In one implementation, module 44 carries out a direct comparison of the number of identified keywords assigned to the work context and the number of identified keywords assigned to the personal context to determine which context mobile device 22 is presently being operated. In yet another implementation, module 44 compares either the number of identified keywords assigned to the work context or the number of identified keywords assigned to the personal context to a predetermined threshold for triggering a context determination. In some implementations, the database of different keywords assigned to either the work context or the personal context additionally comprises different weights or values assigned to each keyword, wherein the identification of a particular keyword assigned to a particular context may be given greater import or influence by module 44 when determining the present context a mobile device 22 as compared to another different identified keyword.

In one implementation, context determination module 44 determines the present context of mobile device 122 based upon the one or more identified keywords as well as other criteria, providing more accurate context determination. For example, in one implementation, context determination module 44 determines the present context of mobile device 122 utilizing the identify keywords in combination with one or more of the present geo-location of mobile device 122 as determined from signals from geo-location time source 186 (shown in FIG. 3). In one implementation, context determination module 44 determines the present context of mobile device 122 based upon different weights applied to each of the different criteria. For example, context determination module 44 may place greater weight or importance upon the geo-location of mobile device 122 or a particular identified keyword as compared to the present time when determining the context of mobile device 122. In one implementation, system 120 determines the present context of mobile device 122 according to a weighting scheme for the different criteria as entered by the user mobile device 122.

As indicated by block 310, operational mode control module 148 automatically, without user intervention, switches the operation of mobile device 122 between either the work operational mode or the personal operational mode based upon the determined present context of mobile device 122. As indicated by block 312, hardware function allocation module 150 automatically, without user intervention, allocates hardware or hardware functions based upon the determined context. As indicated by blocks 314, 316 and 318, respectively, the allocation of hardware functions comprises the allocation of different displays, different processing units and/or different communication interfaces to different applications currently running or comprises the authorization for use of selected hardware depending upon the determined context.

As indicated by block 322, ID/account assignment module 158 automatically, without user intervention, switches between different identifications and/or account assignments based upon the determined context in which mobile device 122 is operating. As indicated by block 324, depending upon the determined context, module 158 may automatically switch between the use of different subscriber identity modules (SIM) cards carried by mobile device 122. For example, mobile device 122 may carry a first SIM card for personal use and a second SIM card for work use. Module 158 automatically switches mobile device 122 between the SIM card appropriate for the determined context.

As indicated by block 326, module 158 automatically, without user intervention, alters or switches the operation of mobile device 122 such that mobile device 122 automatically assigns financial or other charges based upon the determined present context of mobile device 122. In one implementation come module 158 automatically enables mobile device 122 to serve as a charging or other authorization token or fob, depending upon the determined context.

As indicated by block 328, module 158 automatically, without user intervention, alters or switches the operation of mobile device 122 such that mobile device 122 utilizes different available services such as different accounts (work or personal), different Internet service providers or the like depending upon the determined context. As indicated by block 330, module 158 automatically switches or alters the operation of mobile device 122 such that mobile device 122 utilizes different signatures depending upon the determined context.

As indicated by block 332, preload module 162 automatically preloads, preinstalls or pre-caches different applications or programs depending upon the determined context. As indicated by blocks 334 and 336, such automatic switching may result in the automatic preloading or preauthorization of work applications or specific application capabilities in a work context and preloading or preauthorization different personal applications or specific application capabilities in a personal context.

As indicated by block 342, data storage selection module 322 automatically, without user intervention, switches mobile device 122 between different operational modes so as to access and retrieve information from different data storages by selectively accessing distinct memory portions and/or by selectively blocking or filtering particular data or data storages. As indicated by blocks 344 and 346 and described above with respect to FIG. 4, data storage selection module 154 automatically accesses one of two data storages for the same type of information based upon whether the determined context of mobile device 122 is a work context or a personal context. In the example illustrated, module 154, depending upon the determined context, accesses either a work data storage 170 or a personal data storage 172 of memory 176 (shown in FIG. 3), wherein memory 176 or portions of memory 176. As described above with respect to FIG. 5, based upon the determined context, data storage selection module 154 automatically accesses one of portions 202A, 202B or a selected type of information from one of the portions 202A, 202B. In one implementation, data storage selection module 154 accesses and retrieves data from one of portions 202 while ignoring, blocking or filtering out data from the other of portions 202. If the determined context is a work context, data storage selection module 154 may retrieve, access or display any of the different types of data 210A-222A while concurrently ignoring, blocking or filtering out the types of data 210B-222B, respectively. Likewise, if the determined context is a personal context, data storage selection module 154 may retrieve, provide access to or display any of the different types of data 210B-222B while concurrently ignoring, blocking or filtering out the types of data 210A-222A, respectively. As a result, when retrieving and displaying a particular type of data in one of the work environment and the personal environment, the user of mobile device 122 is less likely to accidentally retrieve and display the same type of data for the other of the work environment and the personal environment, which may be embarrassing or inappropriate. In addition to reducing a likelihood of inappropriate personal data being presented and displayed in a work environment, data storage selection 154 also reduces the processing power and/or time of the user of mobile device 122 to sort through extraneous information that is not relevant for the particular context.

As further shown by block 347 of FIG. 6, in one implementation, event supplementing module 150 of system 120 additionally utilizes the keywords identified in block 306 to supplement the event on mobile device 122 with additional information. In one implementation, event supplementing module 150 identifies additional keywords which are not necessarily utilized for the determination of context, but which are utilized to identify and retrieve supplemental information for supplementing the event on mobile device 122. Event supplementing module 150 utilizes the one or more keywords identified in block 306 or additionally identified in a subsequent keyword identification block to identify additional information from historically stored events as well as other stored data. Sources from which supplemental information is retrieved include, but are not limited to, emails, calendar data, biographical/contact information, stored or network available social media communications and/or stored documents/application data.

In the example illustrated, system 120 utilizes the determined context to limit the data storage from which the supplemental information is retrieved. For example, if system 120 determines that mobile device 122 is presently operating in a work environment or work context, system 120 retrieves supplemental information from portion 202A of memory 200. By not searching portion 202B containing personal data based on the determined context, system 120 is able to more quickly retrieve relevant supplemental information. Alternatively, if system 120 determines that mobile device 122 is presently operating in a personal context, system 120 retrieves supplemental information from personal storage portion 202B, not searching or limiting the extent of searching in work storage portion 202A.

Figure 7:
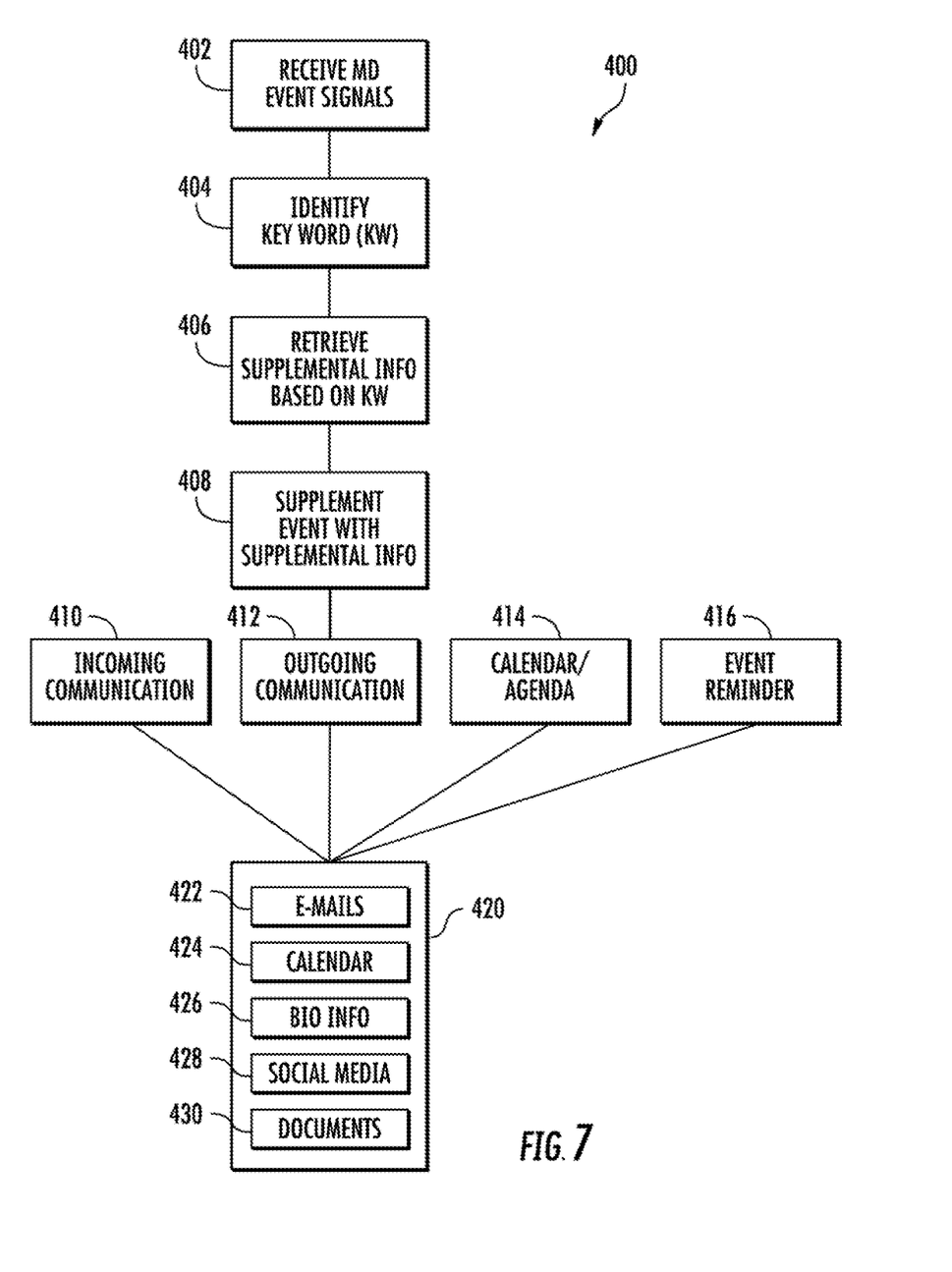
FIG. 7 is a flow diagram of another example method that may be carried out by the system of FIG. 3.

FIG. 7 is a flow diagram illustrating an example method 400 which may be carried out by event supplementing module 150 of system 120 independent of any determination of the context in which mobile device 122 is presently operating. In other implementations, method 400 may be carried out by other mobile devices alone or in combination with remote cloud-based services, wherein the mobile device or other remote cloud-based services may not necessarily include context determination module 44 or operational mode control module 48.

As indicated by block 402, system 120 receives electronic signals associated with an event being carried out are displayed by mobile device 122. Examples of such events include incoming communications, outgoing communications, calendar/agenda items and/or event reminders/notifications. As indicated by block 404, event supplementing module 150 directs processing unit 40 to identify one or more keywords in the electronic signal. Such keywords may identify the sender of a communication, the recipient of a communication or the scheduled participants or topics for the event.

As indicated by block 406, event supplementing module 150 directs processing unit 40 to retrieve supplemental information from other sources based upon the identified keywords. As indicated by block 408, once retrieved, the supplemental information is displayed with the display of the event (the presentation of the calendar item, the event reminder, the recipient of the outgoing communication or the sender of the incoming communication) or links to supplemental information are displayed with the display of the event. With respect to outgoing communications, supplemental information may be presented while the outgoing communication is being composed prior to being sent.

As shown by FIG. 7, different types of events which may be supplemented include incoming communications 410, outgoing communications 412, calendar/agenda items 414 and event reminder/notifications 416. As further shown by FIG. 7, the supplemental information displayed with or linked to the displayed events 410, 412, 414, 416 may be derived from various locally stored or remotely stored sources 420 such as emails 422, stored calendar items 424, biographical/contact information for 26, social media messages 428 and previous stored documents, files or application data 430.

Figure 8:
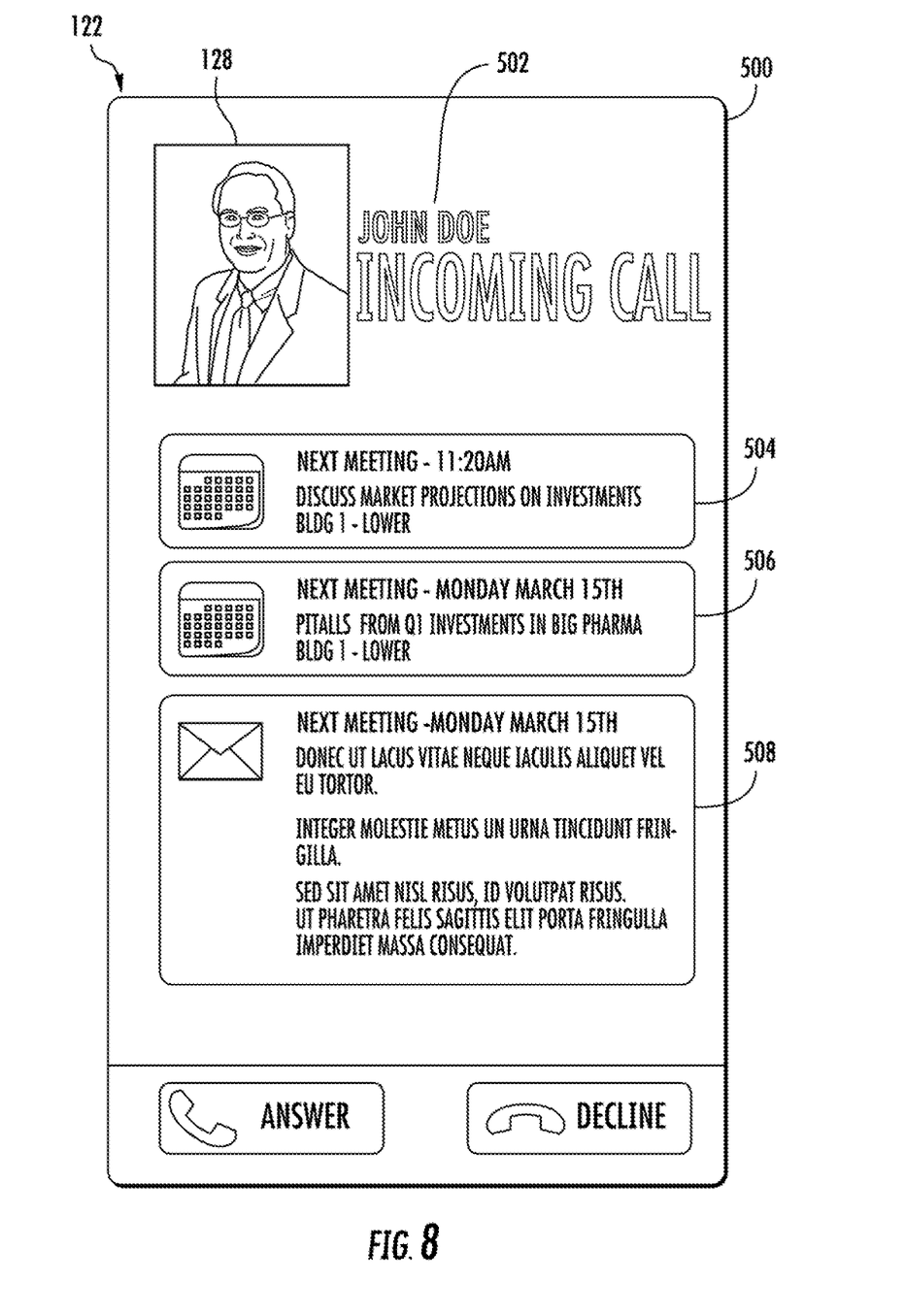
FIG. 8 is an example screenshot on a display of the system of FIG. 3.
Figure 9:
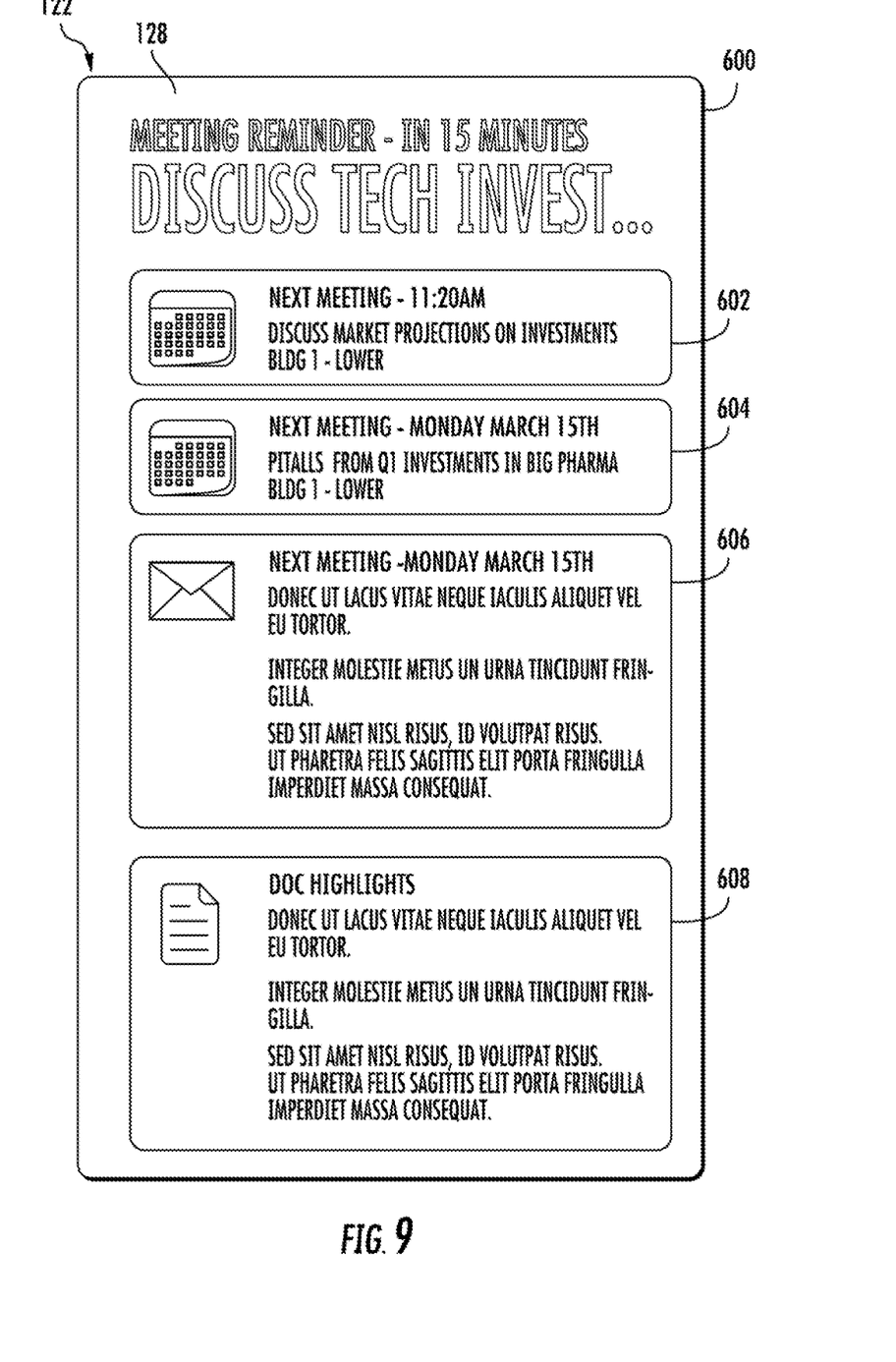
FIG. 9 is another example screenshot on the display of the system of FIG. 3.

FIGS. 8 and 9 illustrate the display of example events on mobile device 122 as supplemented by event supplementing module 150. FIGS. 8 and 9 comprise screenshots of one of the displays 128 of mobile device 122 while system 120 is operating in a supplementing mode of operation. FIG. 8 illustrates an example screenshot 500 of an incoming communication, namely an incoming phone call, being presented on mobile device 122. As shown by FIG. 8, the incoming phone call includes electronic signals identifying the sender 502 of the call. Event supplementing module 150 utilizes the identified sender of the call as a keyword to retrieve supplemental information and simultaneously display the supplemental information along with the identification of the person making the call. In the example illustrated, event supplement module 150 directs processing unit 40 (shown in FIG. 3) to retrieve supplemental information such as calendar information including information regarding the next scheduled meeting with the sender 504 and information regarding the last or most recent scheduled meeting with the sender 506. In the example illustrated, event supplementing module 150 utilizes the identified sender of the call to additionally retrieve and display information from previous emails with the identified sender 508. As a result system 120 serves as a personal assistant providing the user of mobile device 122 with information regarding the sender and what has recently been communicated with the sender.

FIG. 9 illustrates an example screenshot 600 of an event reminder, namely, a reminder for an upcoming meeting, being presented on mobile device 122. In the example illustrated, the event reminder references a scheduled meeting which was stored on a calendar. Utilizing the electronic signals for the event reminder, event supplementing module 150 identifies keywords found in either the reminder or the agenda item of the calendar. Event supplementing module 150 utilizes the identified keywords to retrieve supplemental information and simultaneously display the supplemental information along with the event reminder. In the example illustrated, event supplement module 150 directs processing unit 40 (shown in FIG. 3) to retrieve relevant supplemental information such as calendar information including information regarding the next scheduled meeting 602 (other than the upcoming meeting event for which a notice is being provided) for the topic of the upcoming event or including some of the participants in the upcoming meeting event. In the example illustrated, event supplementing module 150 utilizes the identified keywords found in the event reminder or in the underlying calendared agenda item for the event to additionally retrieve and display (1) information regarding previous meetings 604 having topics related to the topic of the upcoming meeting or having similar participants as the upcoming meeting; (2) previous stored emails 606 or portions of such emails; and stored documents 608 or portions of such documents. As a result, the user of mobile device 122 about to join a meeting is immediately updated with relevant information for the meeting. In circumstances where the upcoming event comprises a personal event, event supplementing module 150 may utilize identified keywords to supplement the displayed notification with relevant information. For example, for personal events such as a soccer game or birthday party, event supplement module 150 may retrieve and display supplemental information such as a map or directions to the address of the soccer game or a map for or address of a retail store that sells party supplies, respectively.

Figure 10:
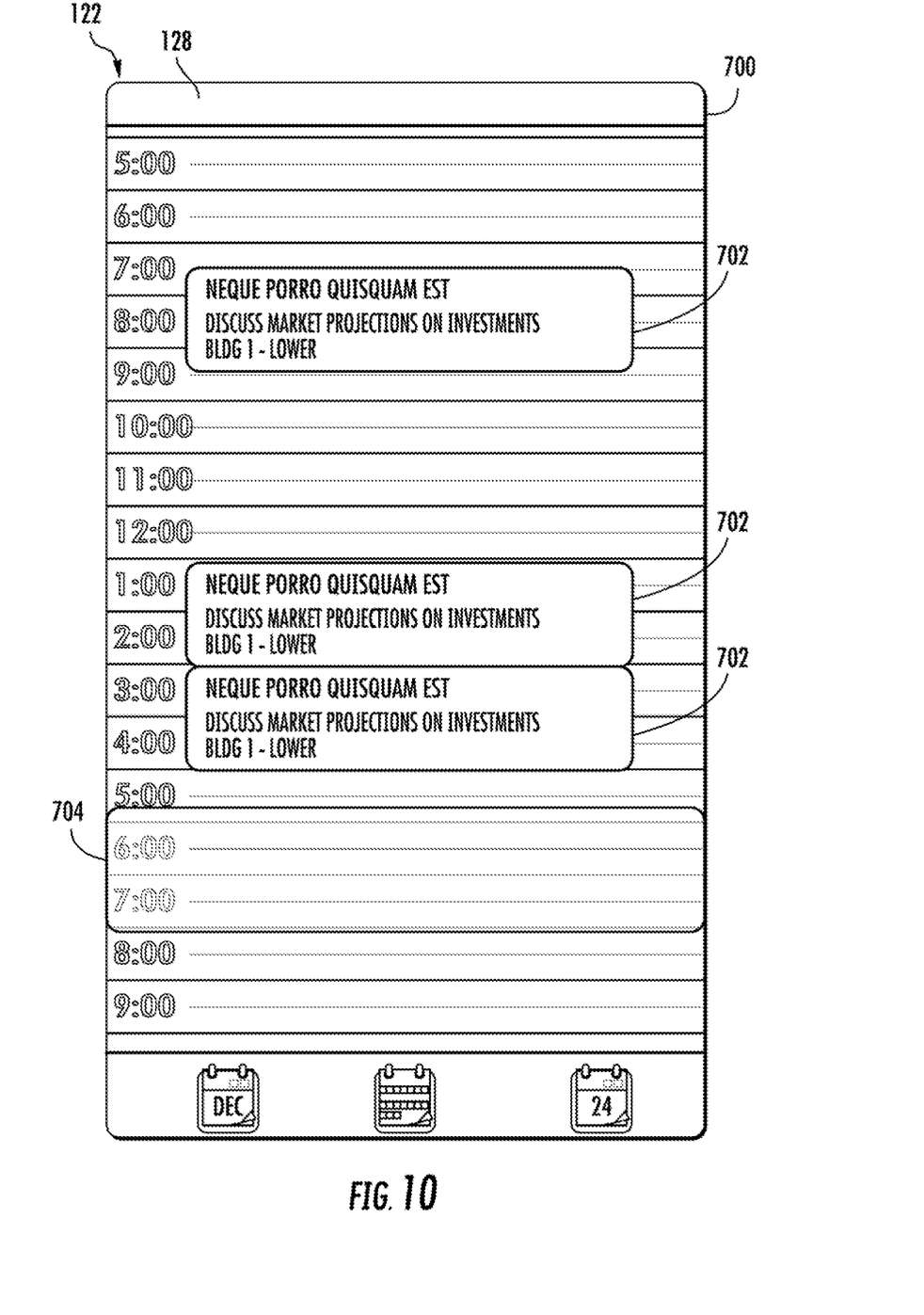
FIG. 10 is another example screenshot on the display of the system of FIG. 3.

FIG. 10 illustrates an example screenshot 700 of an example calendar display presented on one of displays 128 by mobile device 122. FIG. 10 illustrates an example of how mobile device 122 is operable in different operational modes depending upon the context in which mobile device 122 is operating as determined by context determination module 44. In the example illustrated, context determination module 44 has determined that mobile device 122 is presently in a work context. As a result, when a calendar function has been selected on mobile device 22, operational mode control module 148 directs mobile device 22 to automatically switch to a work operational mode in which work agenda items 702 are explicitly displayed with details while personal agenda items 704 are identified with their starting and ending times, but without details. As a result, when showing a work colleague the calendar, the details regarding personal agenda items are not displayed. At the same time, the user of mobile device 122 is made aware of the existence of the personal agenda item 704.

The converse of the above-described operation occurs when context determination module 44 has determined that mobile device 22 is operating in a personal context. In particular, details regarding personal agenda items will be presented on the display calendar while the start and ending times of work agenda items will be identified without details. As a result, the user of mobile device 122 may share his or her calendar with other non-work persons without revealing possibly sensitive or confidential information contained in work agenda items. At the same time, the user of mobile device 122 is made aware of the existence of the work agenda item on the displayed calendar.

Figure 11:
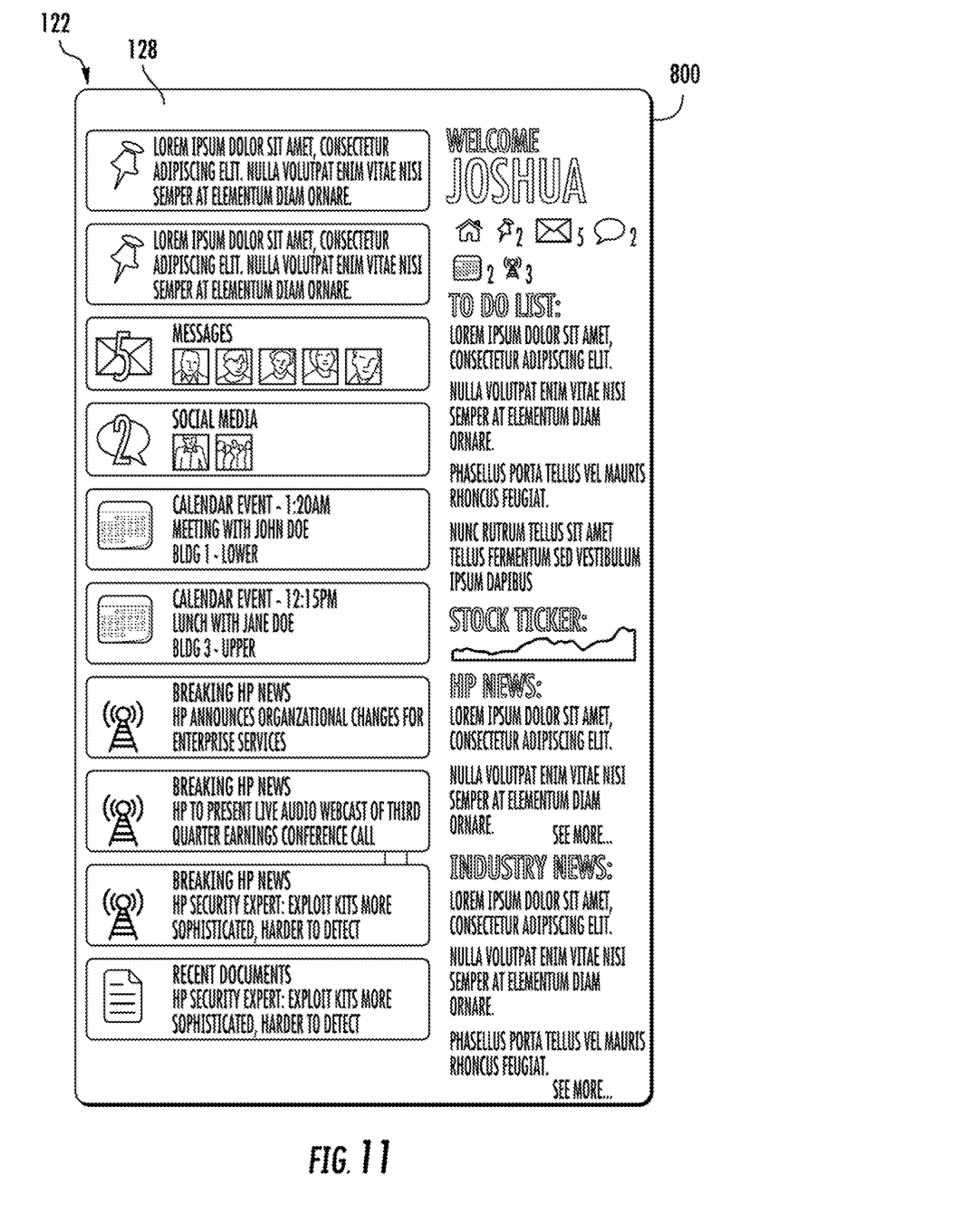
FIG. 11 is another example screenshot on the display of the system of FIG. 3.

FIG. 11 illustrates an example screenshot 800 presented on one of displays 128 of mobile device 122. FIG. 11 illustrates an example of operational mode control module 148 automatically displaying a complete relevant agenda for the user of mobile device 122 based upon the determination by context determination module 44 of whether mobile device 22 is presently being operated in a work context or a personal context. In the example illustrated, context determination module 44 is determined that mobile device 22 is presently operating in a work context. As a result, operational mode control module 148 directs mobile device 122 to retrieve information from a work storage portion, such as storage portion 202A of FIG. 5, while blocking or filtering out personal related information, to form a personalized daily digest of information relevant to the work context. In circumstances where context determination module 44 determines that mobile device 22 is presently operating in a personal context, operational mode control module 148 directs mobile device 122 to operate in a personal operational mode in which mobile device 122 retrieves personal information from a personal storage portion, such as storage portion 202B of FIG. 5, while blocking or filtering out work-related information. As a result, system 120 allows a user of mobile device 122 to stay on top of the flood of information in both work and personal contexts.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:
1. A method comprising:
   determining, with a computing device, a context for a mobile device based on received electronic signals, wherein the context is either a personal context or a work context;

automatically switching the mobile device between different operational modes with the computing device in response to and based upon whether the determined context is the personal context or the work context, wherein the mobile device automatically assigns financial charges incurred through use of the mobile device to either a work account or a personal account depending upon whether the determined context is the personal context or the work context, respectively;

automatically accessing and displaying on the mobile device a type of information from a work data storage in response to the determined context being the work context; and automatically accessing and displaying on the mobile device the type of information from a personal data storage in response to the determined context being the personal context, wherein the received electronic signals are for an event on the mobile device and wherein determining the context comprises identifying a keyword from the received electronic signals and using the keyword to determine the context.

2. The method of claim 1, wherein the mobile device automatically allocates hardware functions on the mobile device in a manner based upon whether the determined context is the personal context or the work context.

3. The method of claim 1 further comprising retrieving and displaying supplemental information for the event based on the keyword.

4. The method of claim 3, wherein the event comprises a communication with another person and wherein the supplemental information is information related to the other person.

5. The method of claim 4, wherein the keyword is an identification of the other person.

6. The method of claim 3, wherein the event comprises an agenda item and wherein the supplementary information is information identified based upon the keyword in the agenda item.

7. The method of claim 1, wherein the signals is selected from a group of signals consisting of geolocation signals and time signals.

8. A method comprising:
determining, with a computing device, a context for a mobile device based on received electronic signals, wherein the context is either a personal context or a work context;

automatically switching the mobile device between different operational modes with the computing device in response to and based upon whether the determined context is the personal context or the work context, automatically accessing and displaying on the mobile device a type of information from a work data storage in response to the determined context being the work context;

automatically accessing and displaying on the mobile device the type of information from a personal data storage in response to the determined context being the personal context, wherein the received electronic signals are for an event on the mobile device and wherein determining the context comprises identifying a keyword from the received electronic signals and using the keyword to determine the context; and retrieving and displaying supplemental information for the event based on the keyword, wherein the event comprises a communication with another person and wherein the supplemental information is information related to the other person and wherein the supplemental information related to the other person is selected from a group of supplemental information related to the other person consisting of:

biographical/contact information of the other person, prior communications with the other person, prior documents composer reviewed by the other person and information regarding prior meetings held with the other person.

9. The method of claim 8, wherein the keyword is an identification of the other person.

10. The method of claim 8, wherein the keyword is contained in content of the communication itself with the other person.

11. The method of claim 8, wherein the determination of the context for the mobile device based on the received signals is based upon a combination of multiple differently weighted criteria based upon a user input weighting scheme.

12. The method of claim 8 further comprising automatically preloading an application for one of the personal context and the work context in response to a determination of the context for the mobile device being said one of the personal context and the work context.

* * * * *

UNITED STATES PATENT AND TRADEMARK OFFICE
CERTIFICATE OF CORRECTION

PATENT NO. : 9,781,594 B2
APPLICATION NO. : 15/105158
DATED : October 3, 2017
INVENTOR(S) : Joshua M Hailpern Page 1 of 1

It is certified that error appears in the above-identified patent and that said Letters Patent is hereby corrected as shown below:

In sheet 3 of 8, reference numeral 332, Line 2, delete "PERLOAD" and insert -- PRELOAD --, therefor.

Signed and Sealed this
Twenty-fourth Day of April, 2018

Andrei Iancu
*Director of the United States Patent and Trademark Office*